C. W. MICHAEL & C. E. MOHR.
COTTON SEED PLANTER.
APPLICATION FILED OCT. 23, 1913.
1,189,718.
Patented July 4, 1916.
3 SHEETS—SHEET 1.
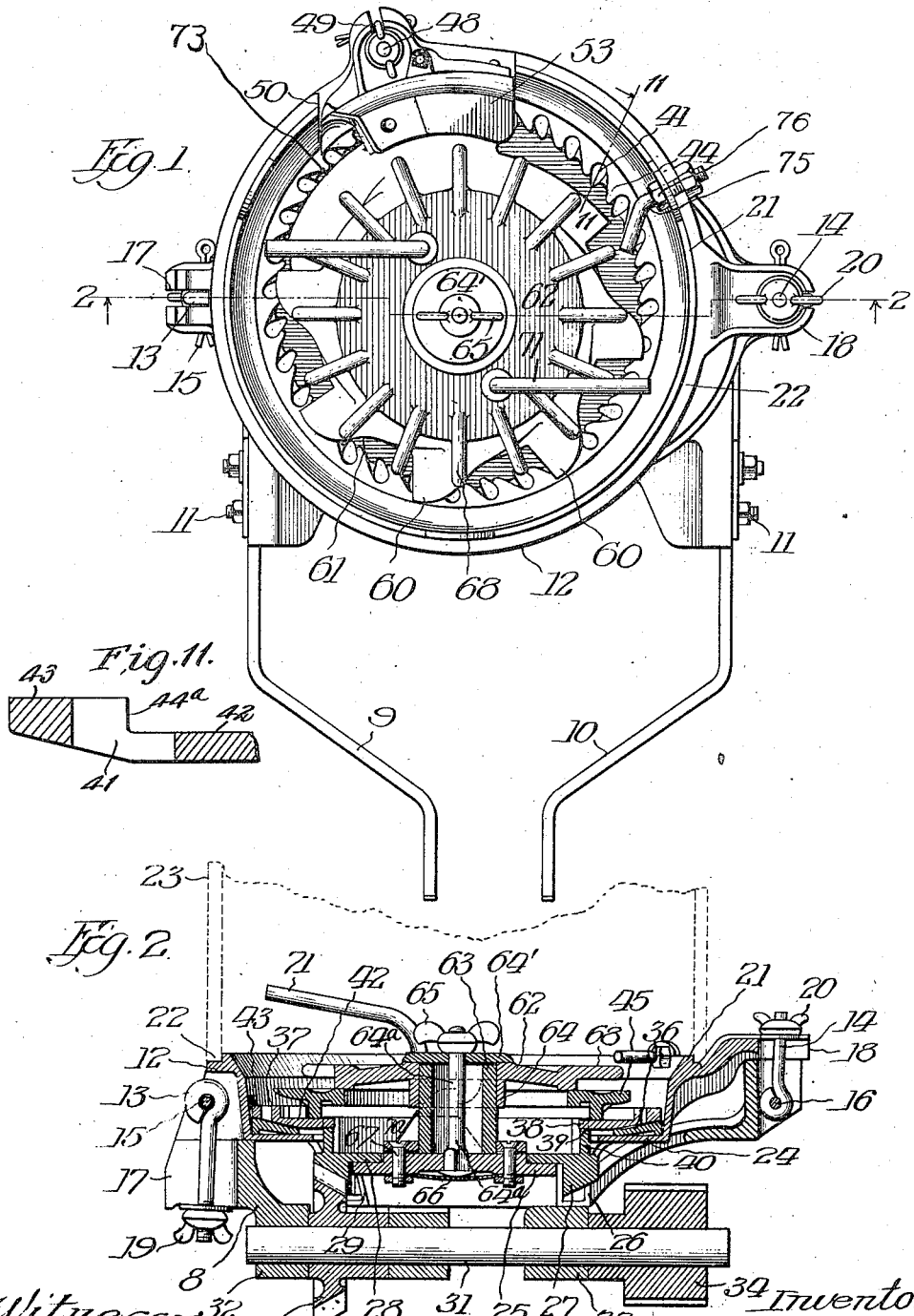

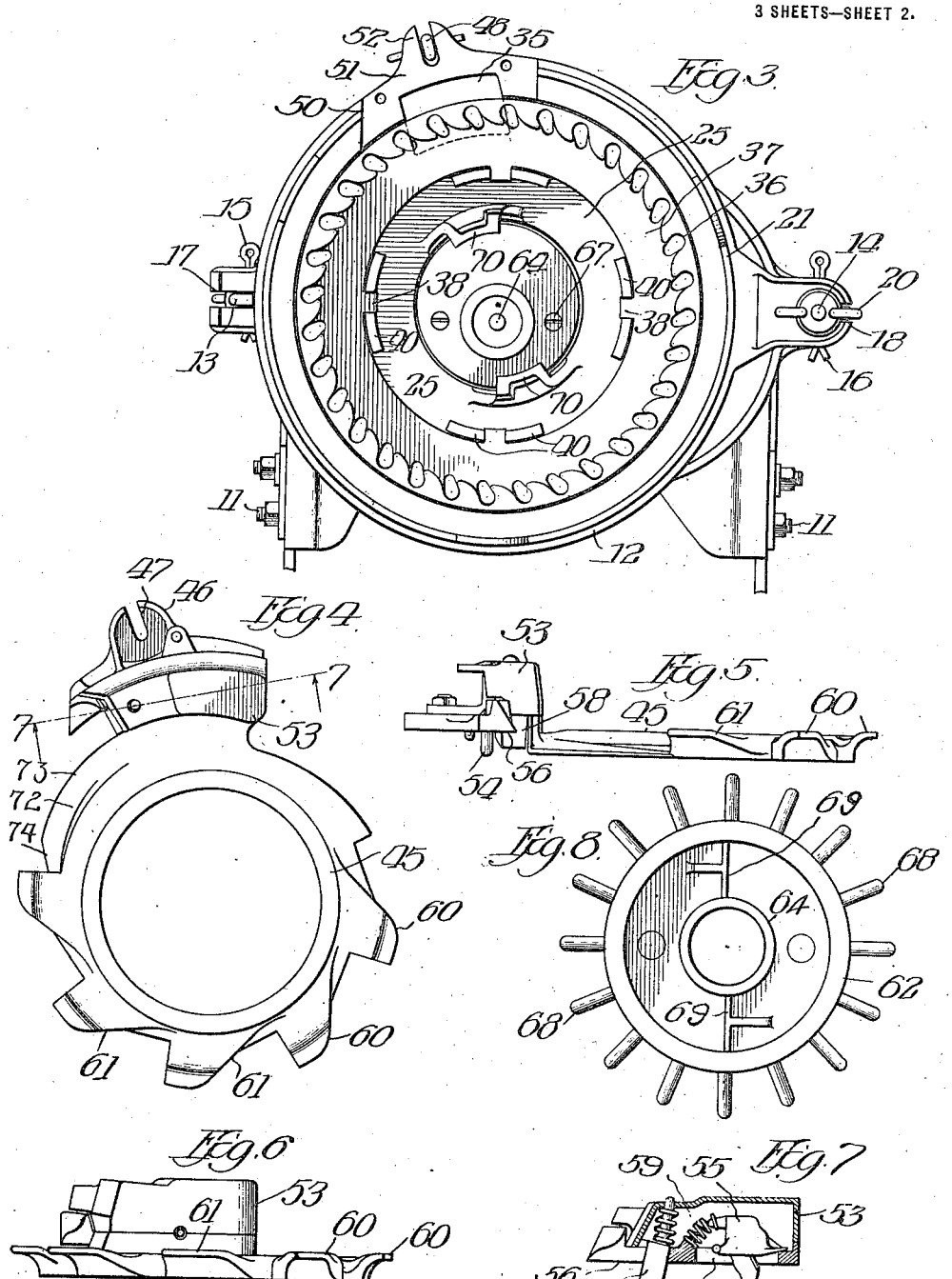

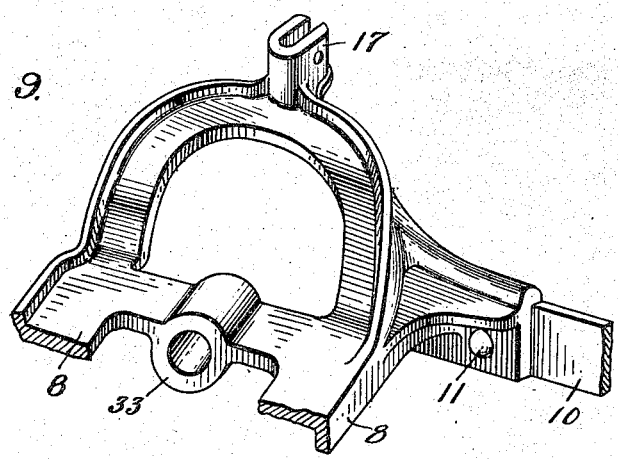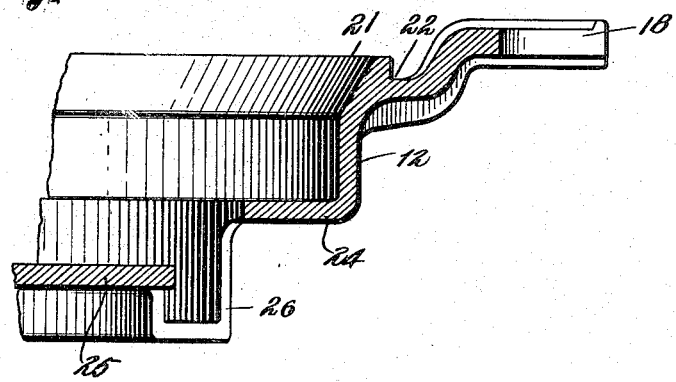

UNITED STATES PATENT OFFICE.

CLEMENT W. MICHAEL AND CHARLES E. MOHR, OF RACINE, WISCONSIN, ASSIGNORS TO
J. I. CASE PLOW WORKS, OF RACINE, WISCONSIN, A CORPORATION OF WISCONSIN.

COTTON-SEED PLANTER.

1,189,718.  Specification of Letters Patent.  Patented July 4, 1916.

Application filed October 23, 1913. Serial No. 796,928.

*To all whom it may concern:*

Be it known that we, CLEMENT W. MICHAEL and CHARLES E. MOHR, citizens of the United States, residing at Racine, in the county of Racine and State of Wisconsin, have invented certain new and useful Improvements in Cotton-Seed Planters, of which the following is a specification.

Our invention is based upon well-known forms of corn and cotton seed planters, examples of which are to be found in U. S. Patents 620,191, Sobey, February 28, 1899, 843,500, Sobey, February 5, 1907, and 881,193, Michael, March 10, 1908. In devices of the character to which said patents relate a hopper is mounted upon the carriage or frame of a soil turning implement and is formed with an opening in its bottom, a rotating disk having pockets or notches of the required size being mounted within the hopper and rotated by suitable means to bring the pockets successively into register with an outlet opening through which the corn or other grain which has been received into the pockets is discharged a kernel at a time. Where, as in the case of corn, the grain is clean and there is no tendency of the several grains to adhere to each other, the problem of feeding them one at a time in the manner described is a comparatively simple one. Feeding of cotton seed, however, while generically the same as that of feeding any other kernel or seed is complicated and made much more difficult by reason of the lint adhering to the seed which is ordinarily left by the gins to which the seed is subjected, and which causes the seed to mass or cling together.

The object of our invention is to provide a cotton seed planter comprising a hopper in which a mass of cotton seed as it comes from the gin may be deposited, having means for overcoming the adhesion between the seed due to their lint and feeding them one at a time at proper intervals for planting.

In the accompanying drawings I have shown and in the following specification described in detail a preferred form of our invention but it is to be understood that the specific disclosure is for the purpose of exemplification only and that the scope of our invention is to be gathered from the following claims in which we have endeavored to distinguish it from the prior art so far as known to us without, however, abandoning or relinquishing any portion thereof.

It is thought unnecessary to show or describe the soil working elements or the general frame of the cotton planter for the reason that as stated above it is similar in all respects to the construction of corn planter well known in the art as for example that disclosed in the patents referred to above.

In the drawings Figure 1 is a view in plan of so much of a cotton planter as is necessary to understand our invention; Fig. 2 is a vertical section on the plane of the broken line 2—2 of Fig. 1; Fig. 3 is a view similar to Fig. 1 but having certain parts removed to better show the underlying structure; Fig. 4 is a plan; Fig. 5 a side elevation from one point of view and Fig. 6 a side elevation from another point of view of one of the important elements of my construction; Fig. 7 is a vertical section on the line 7—7 of Fig. 4, Fig. 8 is a plan of the under face of another element of the construction; Fig. 9 is a perspective view of a portion of the device in detail on an enlarged scale; Fig. 10 a vertical section of another detail also on an enlarged scale, and Fig. 11 a vertical section on the line 11—11, Fig. 1, of the rotating disk or plate.

The main casting 8 which supports the hopper, the seed feeding devices and the means for driving the same, is pivotally connected to the frame by a pair of bent iron straps 9, 10, bolted thereto at 11 in the manner disclosed in said patents. The hopper which receives the seed is mounted directly upon said main casting and comprises a cast cupped bottom portion 12 which rests upon said main casting and is secured thereto by swing bolts 13, 14, pivoted respectively upon the bottom casting at 15 and the main casting at 16 and passing through slotted ears 17, 18 formed respectively on the main and bottom castings, thumb nuts 19, 20 being provided for holding the parts firmly in position. The bottom casting is formed with an annular exterior wall 21 having a rabbet 22 at its upper edge to receive the cylindrical wall 23 of the hopper (see dotted lines Fig. 2), a flat annular wall 24, a central flat circular wall 25 and an annular channel 26 intermediate the last named two walls. The latter receives the downwardly projecting bevel toothed crown 27 forming a part of the cast driving plate 28, said channel portion of the bottom casting being cut away as at 29 to permit the driving bevel pinion 30 to engage said toothed crown. Pinion 30 is secured upon a shaft 31 mounted in bearings 32, 33 cast with the main casting referred to above, and said shaft is further provided with a spur gear 34 for meshing with a driving gear driven from the wheels of the implement or in any other suitable or familiar manner. The bottom casting is formed at 35 with an outlet opening (see dotted lines Fig. 3) and a dished wear plate or annulus 36 is fitted upon the shoulder 24 and cut away in registry with the opening 35 in the bottom casting to permit the passage of seed therethrough. The wear plate is preferably dished on its upper surface as above described for the purpose of exerting a centering effect upon the feed plate, to be presently described, resting thereon, the under surface of the outer portion of which is correspondingly shaped. Upon said wear plate rests the annular feed plate 37 which is formed at suitable intervals with inwardly projecting lugs 38 adapted to rest in seats 39 formed in upwardly projecting lugs 40 cast integral with the driving plate 28. By means of this connection the feed plate can be rotated upon the wear plate, and it is provided with an annular series of seed openings or chambers 41 which as the feed plate rotates are brought successively into registry with the outlet opening through the wear plate and bottom casting respectively. The feed plate comprises an inner thinner annular portion 42 having a depressed upper surface and an outer thicker annular portion 43, the surface of which is in a somewhat higher plane and the seed openings are formed mainly in the outer thicker portion of the feed plate but extend beyond the shoulder between the same and the inner thinner portion and partially into the latter.

Preferably the feed plate is cast integral and the seed openings made oval and not strictly radially arranged but with their major axes inclined slightly forwardly inwardly with reference to the direction of rotation of the plate. The raised rim or outer annular portion 43 between successive seed openings and above the level of the depressed inner portion of the feed plate is formed into tapering teeth 44 which likewise are inclined forwardly with relation to the direction of movement of the feed plate and terminate in substantially vertical edges, each adjacent the more advanced opening of the pair between which said tooth is formed as at 44ª. Because of this construction of the seed openings and the inwardly and forwardly projecting teeth above them, the cotton seeds of the lower layer in the hopper which are fed outwardly by means to be presently described, are engaged by the teeth owing to the rotation of the seed plate to the bottoms of the recesses between the teeth and above or in register with the openings through the seed plates. The space between adjacent teeth is only sufficient for a single cotton seed and there is means provided, to be presently described, for successively punching the cotton seed thus separated from the mass through the openings above which they have lodged.

Immediately above the feed plate is mounted a distributer plate 45 which is held stationary and the function of which is to feed the cotton seed outwardly and also downwardly into the seed openings of the feed plate and to separate the seed so fed from the overlying mass of seed notwithstanding the adherence caused by the fiber by which the seeds are surrounded. The distributer plate is cast integral with an attaching lug 46 which is slotted at 47 for the reception of a swing bolt 48 pivoted upon the bottom casting and provided with a wing nut 49 for securing the lug and distributer plate in position. The outer wall of the bottom casting is cut away at 50 and formed with a flat outwardly projecting flange or shelf 51 to receive and hold the lug upon the distributer plate, and slotted at 52 for the reception of the swing bolt 48 above described. Upon the lug or attaching member of the distributer plate is mounted a housing 53 (see Figs. 5 and 7) containing a spring pressed scraper or cut-off blade 54 and a pivoted finger block 55, the attaching lug of the distributing plate being cut away at 56 and 57 to allow said scraper and the fingers 58 to engage the raised portion of the seed plate. The scraper holds back the mass of cotton above the seed plate as the latter revolves carrying under the housing the seeds in the openings and the finger 58 is thrust by a spring 59 into each seed opening to discharge the cotton seed therefrom into the outlet passage beneath.

The distributer plate in order to facilitate the entry of seed into the seed openings of the feed plate is formed with a series of guide lugs 60 extending partially around its periphery which flare upwardly and outwardly over the raised portion of the seed plate and which taper outwardly as at 61 upon the forward edge against which the cotton seed is carried by the rotation of the feed plate. The result of this construction co-acting with the forwardly projecting teeth formed by the raised portion of the feed plate between the seed openings thereof, is that the seeds upon the lower inner portion of the seed plate are fed outwardly by the distributing plate and when engaged by the teeth between the feed openings are fed into the latter singly. The flaring shape of the guide lugs on the distributer plate also has the effect of gently crowding any cotton seed upon the outer raised portion of the feed plate down into any empty seed openings therein. Upon the upper surface each guide lug is inclined somewhat from the front to the rear to facilitate the entry of the mass of cotton seed passing over the same between it and the following lug. The guide lugs thus act successively upon the cotton seed carried along with the feed plate to retard the same and present the seeds of the lowermost layer to be taken up by the seed openings. Between the last lug of the series, (speaking with reference to the direction of movement of the feed plate) and the scraper or cutoff the distributer plate is formed with an outwardly extending lip or ledge 72 the outer edge of which throughout its greater extent, as at 73, is concentric with the feed plate and rests against the shoulder between the raised and depressed portions thereof and at its forward part presents a thin edge as at 74 (see Fig. 4) from which the ledge thickens or tapers upward rearwardly presenting a gentle incline up which the cotton seed is crowded by the movement of the feed plate to the level of the raised portions thereof, which further facilitates the feeding of the cotton seed to the openings in the feed plate just before the latter arrive at the cutoff or scraper and also facilitates the passage of the body of the cotton seed past the lug and housing of the distributer plate.

In order to insure the feed of the cotton seed to the distributer and feed plates a stirrer 62 is pivoted upon a hollow post 63 rising from the center of the bottom casting. The stirrer is formed with a downwardly projecting hub 64 surrounding said post and is held in place thereon by means of a bolt 64, washer 64' and wing nut 65. A plate 66 secured in place by screw bolts 67 maintains bolt 64 in position when wing nut 65 is removed therefrom. The stirrer plate 62 is formed with an annular series of outwardly projecting fingers 68 for engaging the cotton seed, and rotated by the engagement of downwardly projecting lugs 69 with upwardly projecting lugs 70 upon the drive plate 28 (see Figs. 2 and 8). Upon the stirrer or agitator plate are secured two or more prongs 71 which extend upwardly from said plate and then outwardly and rearwardly serving to not only assist in carrying the mass of cotton around but to feed it outwardly to facilitate its being taken up by the feed plate. A detaining finger 75 is secured to a lug 76 on the bottom casting and forwardly inclined with reference to the direction of movement of the feed plate and assists in holding back the cotton seed to give more relative movement between same and the feed plate. By the inclination given to the detaining finger and the prongs with reference to the direction of travel of the cotton they are prevented from accumulating the lint from the cotton seed.

We claim:

1. In a cotton seed planter, a hopper having an outlet in the bottom thereof, a feed plate pivoted in the bottom of the hopper having seed openings therein adapted to be brought into register with the outlet, and a distributer plate having undercut projections extending upwardly and outwardly partially over but out of contact with the feed plate and adapted to distribute cotton seeds thereto.

2. In a cotton seed planter, a hopper having an outlet in the bottom thereof, a feed plate pivoted in the bottom of the hopper having seed openings therein adapted to be brought into registry with the outlet, and a distributer plate having undercut projections thereon spaced from and above the feed plate adapted to feed the cotton seed outward and downward to the openings in the feed plate and to separate a layer of seed from the mass above it.

3. In a cotton seed planter, a hopper having an outlet in the bottom thereof, a feed plate pivoted in the bottom of the hopper having seed openings therein adapted to be brought into registry with the outlet, and a distributer plate having projections extending outwardly above but spaced from the feed plate and whose forward edges are inclined to the direction of movement of the feed plate and adapted to feed cotton seed outward to the openings therein.

4. In a cotton planter, a hopper having an outlet in the bottom thereof, a circular feed plate mounted for rotation in the bottom of said hopper comprising an inner annular portion having a relatively low surface and an outer annular portion having a relatively raised surface, there being seed receiving apertures entirely within the outer periphery of the feed plate and extending through the outer portion thereof from top to bottom.

5. In a cotton planter, a hopper having an outlet in the bottom thereof, a circular feed plate mounted for rotation in the bottom of said hopper and formed with an inner annular thinner portion having a relatively lower surface and an outer annular thicker portion having a relatively raised surface, seed receiving apertures extending through the outer raised portion from top to bottom thereof, a distributer plate having outwardly extending projections extending above the feed plate and spaced therefrom a sufficient distance to permit the passage of a single layer of cotton seed thereunder.

6. In a cotton planter, a hopper having an outlet in the bottom thereof, a circular feed plate mounted for rotation in the bottom of said hopper and comprising an inner thinner portion and an outer raised portion, seed openings extending through the outer raised portion from top to bottom thereof and extending through the shoulder between the inner and outer portions of the feed plate.

7. In a cotton planter, a hopper, an annular feed plate mounted for rotation in the bottom thereof comprising an inner lower annulus and an outer raised annulus with a shoulder between the two, seed holes extending through the raised annulus from top to bottom thereof and opening through said shoulder and means for feeding the cotton seed outwardly into said openings.

8. In a cotton seed planter, a hopper, a feed plate mounted for rotation in the bottom thereof comprising an inner lower annulus and an outer raised annulus, substantially vertical seed openings in the latter extending through the top thereof and through the shoulder between the two and forming forwardly projecting teeth between said openings and means for feeding cotton seed outwardly to said openings.

9. In a cotton seed planter, a hopper, a feed plate pivoted in the bottom thereof having an annular series of seed openings, there being an outlet opening in said hopper with which the seed openings are adapted to be brought into registry, and a distributer plate having outwardly projecting lugs, the forward edges of which are inclined to the direction of travel of the feed plate to feed the cotton seed outwardly and which are upwardly flared, spaced from the feed plate and adapted to feed the seed downwardly.

10. In a cotton seed planter, a hopper having a discharge opening in the bottom thereof, a feed plate mounted for rotation on said bottom and having seed openings adapted to be brought into registry with said outlet opening, a distributer plate having upwardly and outwardly flaring projections extending over the feed plate, the forward edges of said projections being inclined outwardly and rearwardly to feed the cotton seed to said seed openings.

11. In a cotton seed planter, a hopper having a discharge opening in the bottom thereof, a feed plate mounted for rotation on said bottom comprising an inner depressed annular portion and an outer elevated annular portion, seed openings in the elevated portion extending through the top thereof and through the shoulder between said portions, a distributer plate mounted over said feed plate and having outwardly and upwardly extending guiding projections extending toward said seed openings, the forward edges of said projections being inclined to feed the seed to said openings.

12. In a cotton seed planter, a hopper, a feed plate having a depressed inner portion and an elevated outer portion rotatively mounted in the bottom of the hopper, means for rotating the feed plate, a distributer plate having an outwardly extending tapering lip extending over the depressed portion of the feed plate and adapted to raise a mass of cotton seed therefrom.

13. In a cotton seed planter, a hopper, a feed plate rotatively mounted in the bottom of the hopper having a depressed inner portion and an elevated outer portion and seed openings formed in the latter, a distributer plate having a series of guide lugs and a lip upwardly inclined from its forward to its rear end extending over the depressed portion of the feed plate and substantially in contact at its outer edge with the elevated portion of the feed plate and adapted to raise the cotton seed from the depressed portion of the feed plate.

14. In a cotton seed planter, a hopper, a feed plate rotatively mounted in the bottom of the hopper, there being seed openings in the feed plate and a discharge opening in the bottom of the hopper, and a detaining finger mounted on the outer wall of the hopper and inclined inwardly in the direction of travel of the feed plate for retarding the movement of the mass of cotton seed.

15. In a cotton seed planter, a hopper, a feed plate rotatively mounted in the bottom of the hopper and having an annular series of seed openings therein, means for rotating the feed plate, a distributer plate projecting over and coacting with the feed plate to distribute the cotton seed thereto, a stirrer plate and prongs projecting therefrom and adapted to engage a mass of cotton seed in the hopper, and means to rotate the stirrer plate.

16. In a cotton seed planter, a hopper having an outlet in the bottom thereof, a feed plate pivoted in the bottom of the hopper comprising an inner lower portion and an outer raised portion and having seed openings therein adapted to be brought into registry with the outlet and division walls between said openings and extending above the lower portion of the plate and adapted to separate the seed and direct them to said openings.

17. In a cotton seed planter, a hopper having an outlet in the bottom thereof, a feed plate pivoted in the bottom of the hopper comprising an inner lower portion and an outer raised portion, having seed openings therein adapted to be brought into registry with said outlet, inwardly and forwardly directed teeth extending above said lower portion, and means for forcing the seed outwardly across the lower portion of the plate into contact with said teeth.

18. In a cotton seed planter, a hopper having an outlet in the bottom thereof, a feed plate pivoted in the bottom of the hopper comprising an inner lower portion and an outer raised portion, having seed openings therein adapted to be brought into registry with said outlet, inwardly and forwardly directed teeth extending above said openings, and means for forcing the seed outwardly across the lower portion of the plate and downwardly into contact with said teeth.

19. In a cotton seed planter, a hopper having an outlet in the bottom thereof, a feed plate comprising an inner lower portion and an outer raised portion and having seed openings therethrough adapted to be brought successively into registry with said outlet, inwardly and forwardly directed teeth above said lower portion and between said openings, and a distributing plate having outwardly and upwardly extending projections the rear edges of which are inclined to feed the seed outwardly into contact with said teeth.

20. In a cotton seed planter, a hopper having an outlet in the bottom thereof, a feed plate having a series of apertures therein for the reception of single seed, a raised rim upon the outer periphery of said plate for limiting the outward motion of seed above said apertures, inwardly extending teeth integral with said rim and between the apertures, and means for feeding the seed outwardly over said feed plate.

21. In a cotton seed planter, a hopper having an outlet in the bottom thereof, a feed plate having a series of apertures therein for the reception of single seed, a raised rim upon the outer periphery of said plate for limiting the outward motion of seed above said apertures, forwardly extending teeth formed with said rim and extending between said apertures, and means for feeding the seed outwardly over said feed plate.

22. In a cotton seed planter, a hopper having an outlet in the bottom thereof, a feed plate having a series of apertures therein for the reception of single seed, a raised rim upon the outer periphery of said plate for limiting the outward motion of seed above said apertures, forwardly extending teeth formed with said rim above and between said apertures, and a distributer plate having projections extending over the feed plate and apertures therein and adapted to feed the seed outward thereover.

23. In a cotton seed planter, a hopper having an outlet in the bottom thereof, a feed plate having a series of apertures therein for the reception of single seed, a raised rim upon the outer periphery of said plate for limiting the outward motion of seed above said apertures, forwardly extending teeth formed with said rim above and between said apertures, a distributer plate having projections extending over the feed plate and apertures therein and adapted to feed the seed outward thereover, and a cut-off engaging the upper surface of the feed plate for cutting off the mass of material from the seeds in the apertures as the latter approach the outlet.

24. In a cotton seed planter, a casting forming the bottom thereof having an inwardly extending ledge, a dished wear plate 36 arranged upon said ledge, a feed plate having an upwardly flared lower surface revolubly mounted upon the wear plate, outlet openings in the wear plate and bottom respectively, seed openings in the feed plate, and means for revolving the latter.

CLEMENT W. MICHAEL.
    CHARLES E. MOHR.

Witnesses:
 Joseph D. Kelly,
 Stanley A. Brewer.